United States Patent [19]

Westhof et al.

[11] Patent Number: 5,254,228
[45] Date of Patent: Oct. 19, 1993

[54] MODIFIED CEMENTITIOUS COMPOSITION

[75] Inventors: Luc B. J. Westhof, Arendonk; Frans L. J. De Peuter, Moi, both of Belgium; George G. Tessier, Holland, Pa.

[73] Assignee: ICI Americas, Inc., Wilmington, Del.

[21] Appl. No.: 837,294

[22] Filed: Feb. 14, 1992

[30] Foreign Application Priority Data

Feb. 12, 1991 [GB] United Kingdom ............... 9102904

[51] Int. Cl.$^5$ .......................... B32B 3/02; C04B 7/00
[52] U.S. Cl. .............................. 204/147; 204/130; 204/196; 106/640; 106/644; 106/713; 106/733
[58] Field of Search ............ 106/640, 644, 713, 733; 252/502, 509; 204/130, 147, 196

[56] References Cited

U.S. PATENT DOCUMENTS

| | | | |
|---|---|---|---|
| 1,371,762 | 3/1921 | Hartner . | |
| 3,561,988 | 2/1971 | Kelly . | |
| 4,255,241 | 3/1981 | Kroon et al. | 204/196 X |
| 4,605,572 | 8/1986 | Omata et al. | 427/140 X |
| 4,865,702 | 9/1989 | Miller et al. | 204/130 X |
| 5,026,215 | 6/1991 | Clarke | 106/714 X |
| 5,183,694 | 2/1993 | Webb | 204/196 X |
| 5,198,082 | 3/1993 | Vennesland et al. | 204/130 |

FOREIGN PATENT DOCUMENTS

1410163 2/1965 France .

OTHER PUBLICATIONS

Chemical Abstracts, vol. 89, No. 24, Feb. 11, 1978 Abstract No. 202950 I. M. Grushko et al. "Complex Chemical Additives Using Caustic Soda" p. 331; & Beton Zhelezobeton No. 7, 1978, Moscou pp. 26–28.

Materials Performance, Mar. 1988, pp. 19–25. G. G. Clemena: "Electrically Conductive Portland Cement Concrete."

Chemical Abstracts, vol. 105, No. 2, Jul. 1986, Abstract No. 110290. S. Miyazaki: "Corrosion Inhibition of Steel Reinforcement in Cement or Concrete," p. 295.

Chemical Abstracts, vol. 106, No. 26, Jun. 1987, Abstract No. 218671, M. Kohitsu et al.: "Deterioration Prevention of Cured Concrete," p. 310.

*Primary Examiner*—Karl Group
*Attorney, Agent, or Firm*—Cushman, Darby & Cushman

[57] ABSTRACT

A cementitious composition which contains a base which preferably has a solubility which is greater than that of calcium hydroxide. The amount of this base is such as to provide 0.1 to 2% by-weight of hydroxide relative to the weight of the cementitious composition. The cementitious composition may be a polymer modified mortar which is used as the anode overlay in a cathodically protected reinforced concrete.

7 Claims, No Drawings

MODIFIED CEMENTITIOUS COMPOSITION

The present invention relates to cementitious compositions particularly to modified cementitious compositions which can be used as an overlay material for the anode in a cathodically protected, reinforced concrete structure.

Cementitious compositions are extensively used in many structures including bridges and high buildings and in structures of this type the cementitious composition may be reinforced by metal either as mesh or rod. The metal reinforcement is typically of steel. Many reinforced structures are exposed to weather and structures on or near the coast may be exposed to sea water or sea water spray. Furthermore, bridge structures may be subject to salt which is used in an attempt to keep road surfaces free from ice in winter months. The cementitious material is porous and water and/or salts can penetrate the concrete to the metal reinforcement which becomes corroded. The corrosion can result in deterioration of the reinforcement and in the bonding between the reinforcement and the surrounding concrete with the consequence that extensive restoration work may be required to prevent structural failure.

In an attempt to minimise such effects, it has been proposed that the reinforcement is protected by applying an electric current to the system with the reinforcement being the cathode. The anode in such a system may be a mesh formed from a metal such as copper wires coated with a conductive polymer or a titanium mesh having a metal oxide coating. Such meshes are commercially available, for example as "Elgard Anode Mesh" from Elgard Corporation, Chardon, Oh. 44024-1095, USA. The mesh is secured to the structure to be protected and then coated with an overlay of a suitable cementitious composition. Cathodic protection of the metal reinforcement inhibits corrosion of the reinforcement. The mesh which is the anode is typically embedded in a mortar layer which in many cases is a surface layer or coating which protects the mesh and ensures proper current flow between the mesh and the reinforcement. It has been found that this mortar around the anode mesh deteriorates due to the formation of hydrogen ions at the anode. If the deterioration is allowed to proceed sufficiently, a breakdown in the structure of the mortar can occur and this breakdown can result in delamination affecting the current flow and, ultimately, result in there being no current flow and hence no cathodic protection of the reinforcement. This deterioration of the mortar around the anode can be inhibited by the neutralisation of the hydrogen ions produced.

Thus, according to the present invention there is provided a cementitious composition containing a water soluble base.

Preferably the base is in the form of added hydroxide and it is especially preferred that the base has an aqueous solubility which is greater than that of calcium hydroxide.

The cementitious composition may be any known cementitious composition and in particular is a mortar. The cementitious composition contains a hydraulic cement together with additives known for use in such compositions including, but not restricted to, fillers of various types, plasticisers, antifoaming agents and the like.

The base which is present in the cementitious composition is one preferably having a solubility which is greater than that of calcium hydroxide. The base is preferably a metal hydroxide or a base which is capable of forming hydroxy ions in the presence of water. Preferably the base is a metal hydroxide and, in particular, is the hydroxide of a metal of Group IA or IIA of the Periodic Table for example alkali metals such as lithium, sodium, and potassium, and alkali earth metals such as magnesium and barium. We have found that the presence of lithium, sodium, potassium or barium hydroxide in the cementitious composition limits the spread of acid through the composition from the anode whereas the presence of the same proportion of added hydroxide ions in the form of calcium hydroxide shows a lesser effect on the spread of acid from the anode compared to the same cementitious composition with no added hydroxide. The base is typically present in the cementitious composition in an amount to provide from 0.1 to 2.0%, and especially from 0.5% to 1.5%, by weight, of hydroxide, relative to the weight of cement in the composition.

The cementitious composition of the present invention is particularly suitable for use as the mortar in which the anode is embedded in a metal reinforced structure having cathodic protection.

The cementitious composition of the present invnetion may additionally contain other additives which increase the conductivity of the composition such as particulate carbon, carbon fibres and metal-coated fibres. It is thus to be understood that by reference to our co-pending applications GB 9102891.0 and GB 9102892.8 that the conducting materials disclosed therein may also be included in the cementitious composition of the present invention.

The cement is preferably a hydraulic cement by which is meant the class of structural materials which are applied in admixture with water and thereafter harden or set as a result of physical or chemical changes which consume the water present. A typical example of such materials is Portland cement. Other hydraulic cements include:

1. Rapidly hardening cements, as characterised by those with high alumina contents.
2. Low-heat cements as characterised by high percentages of dicalcium silicate and tetra-calcium alumino ferrite and low percentages of tricalcium silicate and tricalcium aluminate.
3. Sulphate resisting cements as characterised by unusually high percentages of tricalcium silicate and dicalcium silicate and unusually low percentages of tricalcium aluminate and tetracalcium alumino ferrite.
4. Portland blast-furnace cement as characterised by a mixture of Portland cement clinker and granulated slag.
5. Masonry cements as characterised by mixture of Portland cement and one or more of the following: hydrated lime, granulated slag, pulverised limestone, colloidal clay, diatomaceous earth or other finely divided forms of silica, calcium stearate and paraffin.
6. Natural cements as characterised by material obtained from deposits in the Lehigh Vally, USA.
7. Lime cements as characterised by oxide of calcium in its pure or impure forms and whether containing or not some argillaceous materials.
8. Selenitic cement as characterised by the addition of 5–10% of plaster of Paris to lime.

9. Pozzolanic cement as characterised by the mixture of pozzolana, trass kieselguhr, pumice, tufa, santorin earth or granulated slag with lime mortar.
10. Calcium sulphate cements as characterised by those depending on the hydration of calcium sulphate and including plaster of Paris, Keene's cement and Parian cement.

The preferred hydraulic cement is Portland cement. White Portland cement, which is a cement of low iron and carbon content manufactured from specially selected ingredients, may also be used.

The cementitious composition may, and preferably does, contain other ingredients which are present in conventional cementitious compositions. Thus, the cementitious composition typically contains at least one filler and, as examples of fillers which may be employed, there may be mentioned, in particular, siliceous fillers such as sand and gravel having a low clay content, preferably washed and having a particle size in the range of between 0.076 mm and 4 cm. If the cementitious composition is a mortar it is generally preferred that the filler has a particle size of less than 2 mm.

The fillers used may be in their natural state or they may be artificially coloured, for example, by application of a dyestuff or pigment. Fragments of glass, which may be clear, translucent or opaque, colourless or coloured, are also suitable. Other fillers which may be used are materials which have a low density compared with the siliceous fillers mentioned previously, for example, fragments of colourless or mass-pigmented plastic in the form of chips, turnings, tape or granules, conveniently the plastic waste resulting from the trimming of injection moulded articles or from other moulding processes. Suitable plastic materials include thermoplastic or thermosetting polymers and copolymers, for example, nylon polymers, polyvinyl chloride, vinyl chloride/vinyl acetate copolymers, urea/formaldehyde polymers, phenol/formaldehyde polymers, melamine/formaldehyde polymers, acetal polymers and copolymers, acrylic polymers and copolymers, acrylonitrile/butadiene/styrene terpolymers, cellulose acetate, cellulose acetate butyrate, polycarbonates, polyethylene terephthalates, polystyrenes, polyurethanes, polyethylenes, and polypropylenes. Some plastic materials are conveniently mixed into the cementitious composition as an aqueous dispersion or emulsion.

Other fillers which may be used include foamed plastics such as polystyrene foam and polyurethane foam, and also sawdust, wood chips, pumice, vermiculite and fibrous materials of natural or synthetic origin, for example, glass fibre, cotton, wool, polyamide fibre, polyester fibre, and polyacrylonitrile fibre.

By the use of low density fillers the overall density of the products resulting from the compositions of the present invention may be greatly reduced if desired. Filler having a fine particle size, by which is meant in the range from 75 microns to 1 micron, may also be used, and as examples of such materials there may be mentioned power station fly ash, expanded clay, foamed slag, mica, chalk, talc, clays such as china clay, barytes, silica, and powdered slate, reduced to the require degree of subdivisions where necessary by grinding, milling, micronising or other suitable means.

Other suitable fillers include aluminium silicate refractory aggregates made by high temperature calcination of a china clay specially selected for low alkali content, and obtainable commercially under the name "Molochite" (Registered Trade Mark); also crushed mineral aggregates manufactured from blue flints obtained from deposits in the Thames Valley and available commercially under the name "Flintag" (Registered Trade Mark) as well as multicoloured calcined flints.

Preferred cementitious composition include a siliceous filler, especially fine sand and may further include a plastic material such as an acrylic polymer. The siliceous filler is present in proportions known for such fillers in conventional cementitious compositions, for example in amounts up to several times by weight of the cement component, such as up to about five times and generally not more than three times. The plastic material, if present, is present in an amount which is typically from 2 up to 20% by weight relative to the weight of the cement component of the composition.

The cementitious composition may also comprise an effective amount of a plasticiser such as melamine/formaldehyde condensates or lignosulphonates. The proportion of the plasticiser typically does not exceed 5% by weight of the cement component and may be less than 1% by weight. If a plasticiser is present, this will typically be present in an amount of at least 0.1% by weight relative to the weight of the cement component.

Should the cementitious composition be such that it has a tendency to foam, then this tendency can be minimised by incorporating in the composition an effective amount of an antifoaming agent which may be a siloxane such as poly(siloxane), poly(alkylsiloxane) or poly(dialkylsiloxane).

The present invention is further illustrated by the following examples which are not limiting.

EXAMPLES 1 TO 5

A cementitious composition was prepared by dry blending the following ingredients in the following proportions, by weight:

| | |
|---|---|
| Portland cement | 33% |
| Polyethylene fiber | 0.1% |
| Lime | 0.34% |
| Plasticiser (melamine formaldehyde condensate) | 0.28% |
| Hydroxypropoxymethyl cellulose | 0.02% |
| Graded silica sand (63 to 800 micrometers) | 65.96% |
| Powdered defoamer, (blend of hydrocarbons, fatty substances, non-ionic emulsifiers and silicone oil) | 0.3% |

This cement blend was mixed with an aqueous acrylic dispersion (available from Rohm and Haas as Primal MC76 registered trade mark) having a solids content of 18.7% by weight, the proportions used being such that the acrylic polymer content was 8% of the weight of the cement in order to form Example A. Examples 1 to 5 were prepared by mixing Example A with 1% of the metal hydroxide identified in the following Table. Each cementitious composition was made in to a mortar by mixing with water.

Each of the mortars was moulded into a prism and a metal oxide coated titanium wire ("Tectrodell" lead-wire available from ICI Chemicals and Polymers Limited) was partially embedded in the mortar prism before allowing the mortar to set. The titanium wire was connected, as the anode, to a constant current unit (D.C.) and a steel rod was connected as the cathode. The prism and the steel rod were immersed in an aqueous solution saturated with lime and sodium chloride. A potential difference was established between the anode and cathode to give a current of 3.87 mA. After 25 days, the mortar prism was disconnected and removed from the solution. The prism was split along the length of the coated titanium wire. A solution containing phenolphthalein indicator was sprayed onto the newly exposed mortar surface and the portion of the mortar which turned pink was determined to indicate the amount of mortar not affected by hydrogen ions. The results obtained are set out in the following Table.

TABLE

| Ex | Hydroxide added | | % mortar affected (b) |
|----|------|-------|-------|
|    | Type | % (a) |       |
| A  | NIL  | 0     | 49.28 |
| 1  | Li   | 1     | 2.27  |
| 2  | Ba   | 1     | 4.46  |
| 3  | Ca   | 1     | 19.95 |
| 4  | K    | 1     | 0     |
| 5  | Na   | 1     | 0     |

Note to Table
(a) % is amount (weight) of base as metal hydroxide relative to the cement component of the mortar.
(b) % of mortar surface not coloured pink by phenolphthalein.

It will be observed that sodium, potassium, lithium and barium hydroxides produced a considerable reduction in the proportion of the mortar volume which was uncoloured, indicating a reduction in the amount of mortar containing these bases affected by hydrogen ions.

We claim:

1. In a reinforced concrete structure which is cathodically protected by means of a cathode and an anode embedded in a cementitious composition, the improvement which comprises including a water-soluble base selected from the group consisting of hydroxides of lithium, sodium, potassium, and barium in said cementitious composition to neutralize hydrogen ions formed at the anode whereby deterioration of the anode and consequent loss of cathodic protection are inhibited.

2. A structure as claimed in claim 1 which contains from 0.1 to 2.0% by weight of base, relative to the cement.

3. A structure as claimed in claim 1 wherein the cement is hydraulic cement.

4. A structure as claimed in claim 1 which additionally contains an additive which increases the conductivity of the composition.

5. A structure as claimed in claim 4 wherein the additive is particulate carbon, carbon fibre or a metal coated fibre.

6. The structure of claim 1 wherein the cathode is the reinforcement of the structure; the anode comprises a metal and the base is present in an amount of from 0.1 to 2.0% by weight of the cement in the cementitious composition.

7. In a method of cathodically protecting a reinforced concrete structure using the reinforcement as the cathode and an anode embedded in an overlay of a cementitious composition, the step which comprises using, as the overlay, a cementitious composition containing a water-soluble base selected from the group consisting of hydroxides of lithium, sodium, potassium, and barium in an amount sufficient to inhibit the formation of hydrogen ions at the anode.

* * * * *